(12) United States Patent
Wallman (10) Patent No.: US 6,360,210 B1
(45) Date of Patent: Mar. 19, 2002

(54) METHOD AND SYSTEM FOR ENABLING SMALLER INVESTORS TO MANAGE RISK IN A SELF-MANAGED PORTFOLIO OF ASSETS/LIABILITIES

(75) Inventor: Steven M. H. Wallman, Great Falls, VA (US)

(73) Assignee: Folio Trade LLC, Great Falls, VA (US)

( * ) Notice: Subject to any disclaimer, the term of this patent is extended or adjusted under 35 U.S.C. 154(b) by 0 days.

(21) Appl. No.: 09/249,022

(22) Filed: Feb. 12, 1999

(51) Int. Cl.⁷ .............................................. G06F 17/60

(52) U.S. Cl. ........................... 705/36; 705/35; 705/37; 705/38

(58) Field of Search .................. 705/36, 35, 37, 705/4

(56) References Cited

U.S. PATENT DOCUMENTS

| | | | |
|---|---|---|---|
| 4,346,442 A | 8/1982 | Musmanno | 364/408 |
| 4,376,978 A | 3/1983 | Musmanno | 364/408 |
| 4,566,066 A | 1/1986 | Towers | 364/408 |
| 4,597,046 A | 6/1986 | Musmanno et al. | 364/408 |
| 4,642,768 A * | 2/1987 | Roberts | 705/35 |
| 4,648,038 A | 3/1987 | Roberts et al. | 364/408 |
| 4,674,044 A | 6/1987 | Kalmus et al. | 364/408 |
| 4,750,121 A | 6/1988 | Halley et al. | 364/408 |
| 4,751,640 A | 6/1988 | Lucas et al. | 364/408 |
| 4,774,663 A | 9/1988 | Musmanno et al. | 364/408 |
| 4,910,676 A | 3/1990 | Alldredge | 364/408 |
| 4,933,842 A | 6/1990 | Durbin et al. | 364/408 |
| 4,953,085 A | 8/1990 | Atkins | 364/408 |
| 4,980,826 A | 12/1990 | Wagner | 364/408 |
| 4,989,141 A | 1/1991 | Lyons et al. | 364/408 |
| 4,994,964 A | 2/1991 | Wolfberg et al. | 364/408 |

(List continued on next page.)

FOREIGN PATENT DOCUMENTS

| | | | | |
|---|---|---|---|---|
| EP | 0 278 132 | * | 9/1987 | G06F/15/21 |
| WO | WO 91/02326 | * | 2/1991 | G06F/15/21 |
| WO | WO 98/44443 | | 10/1998 | |
| WO | WO 98/44444 | | 10/1998 | |
| WO | WO 99/28845 | | 6/1999 | |

OTHER PUBLICATIONS

Chatrath, A., Liang, Y., McIntosh, W., "Can we hedge REIT returns?" Real Estate Finance v15n4, Winter 1999, pp. 78–84, Nov. 1999.*

Putnam, B., "Lessons in quantitative risk management", Global Investor. n99, Feb. 1997, pp 42–44.*

Sanders, Gordon T, Best's Review/Property–Casualty Insurance Edition, May 1995, vol. 96 Issue 1, p16, 3/5p.*

Mortgage Marketplace, Mar. 16, 1998, vol. 21 Issue 11, p1, 2p.*

Birger, Jon, Crain's New York Business, Sep. 15, 1997, vol. 13, Issue 37, p44, 2/5p.*

Connolly, Jim, National Underwriter/Life & Health Financial Services, Sep. 2, 1996, vol. 100 Issue 36, p63, 3/4p..*

Dwyer III, Joe, St. Louis Business Journal, Mar. 4, 1996, vol. 16 Issue 25, p3B, 1/2p, 1bw.*

Robert Barker, A Capital–Gains Miracle Worker, Business Week, Jan. 31, 2000, p. 130.

Anne Tergesen, Here Come the E–Funds, Business Week, Jan. 31, 2000, p. 125.

1998 ADP Investor Communications Services, ProxyEdge™ 2000.

Primary Examiner—James P. Trammell
Assistant Examiner—Chang Y. Chung
(74) Attorney, Agent, or Firm—Kenyon & Kenyon (57) ABSTRACT

A computer-based system is disclosed for reducing risk, including market risk, for a given portfolio, by examining the expected risk, pricing it, and transferring some or all of it in exchange for consideration, which can be either cash, other property or part of the opportunity cost forgone in connection with or an assignment of part of the portfolio.

70 Claims, 4 Drawing Sheets

U.S. PATENT DOCUMENTS

| | | | |
|---|---|---|---|
| 5,038,284 A | 8/1991 | Kramer | 364/408 |
| 5,101,353 A * | 3/1992 | Lupien et al. | 705/37 |
| 5,126,936 A | 6/1992 | Champion et al. | 364/408 |
| 5,132,899 A | 7/1992 | Fox | 364/408 |
| 5,148,365 A | 9/1992 | Dembo | 364/402 |
| 5,193,056 A | 3/1993 | Boes | 364/408 |
| 5,202,827 A * | 4/1993 | Sober | 705/36 |
| 5,210,687 A | 5/1993 | Wolfberg et al. | 364/408 |
| 5,214,579 A | 5/1993 | Wolfberg et al. | 364/408 |
| 5,220,500 A | 6/1993 | Baird et al. | 364/408 |
| 5,227,967 A | 7/1993 | Bailey | 364/408 |
| 5,262,942 A | 11/1993 | Earle | 364/408 |
| 5,270,922 A | 12/1993 | Higgins | 364/408 |
| 5,297,032 A | 3/1994 | Trojan et al. | 364/408 |
| 5,375,055 A | 12/1994 | Togher et al. | 364/408 |
| 5,497,317 A | 3/1996 | Hawkins et al. | 364/408 |
| 5,517,406 A | 5/1996 | Harris et al. | 364/408 |
| 5,649,116 A | 7/1997 | McCoy et al. | 395/238 |
| 5,664,115 A | 9/1997 | Fraser | 705/37 |
| 5,671,363 A | 9/1997 | Cristofich et al. | 395/237 |
| 5,689,650 A | 11/1997 | McClelland et al. | 395/236 |
| 5,704,045 A | 12/1997 | King et al. | 395/235 |
| 5,710,889 A | 1/1998 | Clark et al. | 395/244 |
| 5,724,524 A | 3/1998 | Hunt et al. | 395/237 |
| 5,729,700 A | 3/1998 | Melnikoff | 395/236 |
| 5,745,706 A | 4/1998 | Wolfberg et al. | 395/235 |
| 5,749,077 A | 5/1998 | Campbell | 705/36 |
| 5,758,097 A | 5/1998 | Debe et al. | 395/235 |
| 5,761,441 A | 6/1998 | Bennett | 395/235 |
| 5,761,442 A | 6/1998 | Barr et al. | 395/236 |
| 5,765,141 A | 6/1998 | Spector | 705/14 |
| 5,774,881 A | 6/1998 | Friend et al. | 705/36 |
| 5,784,696 A | 7/1998 | Meinikoff | 705/36 |
| 5,794,219 A | 8/1998 | Brown | 705/37 |
| 5,799,287 A | 8/1998 | Dembo | 705/36 |
| 5,806,047 A | 9/1998 | Hackel et al. | 705/36 |
| 5,806,049 A | 9/1998 | Petruzzi | 705/36 |
| 5,812,987 A | 9/1998 | Luskin et al. | 705/36 |
| 5,918,218 A | 6/1999 | Harris et al. | 705/37 |
| 5,926,792 A * | 7/1999 | Koppes et al. | 705/35 |
| 5,930,762 A * | 7/1999 | Masch | 705/7 |
| 5,930,774 A | 7/1999 | Chennault | 705/36 |
| 5,946,666 A | 8/1999 | Nevo et al. | 705/36 |
| 5,978,778 A | 11/1999 | O'Shaughnessy | 705/36 |

\* cited by examiner

Figure 4 -- Sample Interface for Shield/Cost Selection -- 5 Year Horizon

METHOD AND SYSTEM FOR ENABLING SMALLER INVESTORS TO MANAGE RISK IN A SELF-MANAGED PORTFOLIO OF ASSETS/LIABILITIES

RELATED APPLICATIONS

The present invention is related to U.S. patent application Ser. Nos. 09/038,158 entitled "Method and Apparatus for Enabling Smaller Investors or Others to Create and Manage a Portfolio of Securities or Other Assets or Liabilities on a Cost Effective Basis" filed on Mar. 11, 1998 and 09/139,020 entitled "Method and Apparatus for Enabling Smaller Investors or Others to Create and Manage a Portfolio of Securities or Other Assets or Liabilities on a Cost Effective Basis" filed on Aug. 24, 1998, which were both filed by the same inventor. U.S. patent application Ser. Nos. 09/038,158 and 09/139,020 are both hereby incorporated by reference in their entirety, as if repeated herein, including the drawings.

BACKGROUND OF THE INVENTION

The present invention relates generally to methods and systems for managing portfolios of investments, and more particularly to a method and system for managing a portfolio of investments for smaller investors, in which the investor can manage and limit the risk inherent in the portfolio.

Investors increasingly understand the potential for long-term returns from investments in risky assets, i.e., risky investments can provide better returns over the long term as opposed to the returns from less risky assets. For example, an investment in relatively risky common stocks provides, on average and over the long term, a higher return than an investment in a money market account. Unfortunately, risky assets carry risk. Although over time and on average the returns on risky assets may be higher than those of less-risky assets, their returns are more volatile. An investor who wishes to ensure that a certain amount of investment will be preserved as of a specified time has no certainty with risky assets that such preservation will be achieved.

As an example, an investor that purchases a common stock for $100 has no assurance that in five years that share of common stock will be worth $100. By contrast, an investor that buys a 5 year Treasury note with a principal amount payable at maturity of $100 knows that (with almost 100% certainty), at the end of the five years, the note will pay precisely $100. For this reason, investors are frequently provided with advice to the effect that they should place their investments in different risk classes—usually short term (non-risky), intermediate term (some limited risk) and long term (risky). Under this structure the riskiness of long-term investments presumably provides a boost to overall expected returns while the probable preservation of value in the less risky part of the portfolio ensures that short-term cash needs can be satisfied. This advice attempts, at one level, to take into account the concept of risk, and reflects the general notion that risk is correlated with returns: the higher the risk, the higher the expected returns, and vice-versa.

There are a number of different ways of thinking about or characterizing types of risk. One type of risk is known as firm specific risk (which is relative to an individual company), which is closely related to firm credit and/or default risk. Very generally speaking, these are the risks that, if equity or debt, the share price will be highly volatile as opposed to relatively stable and the risk, if equity or debt, that the investment in the entity will not be repaid. Another type of risk, known as market risk (which is separate from the risk of any firm specific risk) is the risk that the relevant "market" as a whole will increase or decrease in value; the specific value of an investment may be correlated, to varying degrees, with "the market." Yet another type of risk, known as liquidity risk is the risk that the investment can be paid or liquidated on short notice. There are many other risks as well, and different ways of thinking about these risks. While the present invention discusses these three types of risk, it is not limited in application to these three types of risk.

Assets suggested as short term investments generally are low risk from a variety of perspectives. First, the investment will be safe as to principal amount (e.g., the investment has low credit risk). Second, the investment will fluctuate little if at all relative to the market or to interest rates or other general economic variables (e.g., the investment has low market risk). Third, the investment will be available when needed on short notice (e.g., the investment has low liquidity risk).

Examples of short-term investments abound, ranging from traditional banking vehicles, such as passbook savings and interest-bearing checking accounts and short-term certificates of deposit, to short-term government bonds, to short-term highly rated corporate notes, to open-end mutual funds invested in such instruments (e.g., "money market mutual funds") and funds investing in guaranteed bonds with short durations, etc. In this range of investments, rates of return are traditionally low, thus reflecting the low overall risk of the investments.

Medium and long-term investments generally have additional firm specific, market or liquidity risk. With higher levels of such risk, investors demand higher returns—which increases the cost of capital. Consequently, ever since investments were created efforts have been made to reduce these and other risks for investors. Such risk reduction would potentially attract a greater supply of capital to these investments, thereby lowering the returns demanded by investors and potentially lowering the cost of capital.

Firms can reduce liquidity risk by fostering a ready market for their securities. The advent of the traditional secondary trading markets has significantly reduced liquidity risk for publicly traded securities, which is part of the attraction of the public markets. Liquid secondary markets also reduce liquidity risk for various non-publicly-traded securities, such as open-end mutual fund shares. Specifically, liquid secondary markets enable open-end mutual funds—whose shares do not trade publicly—to provide liquidity to their shareholders (the individuals and institutions that invest through mutual funds). Because the fund can liquidate quickly some of its holdings to pay shareholders who wish to sell shares in the fund, the fund can, in essence, "make a market" in their own shares and guarantee liquidity to these holders by redeeming their interests in the fund for cash the next day at net asset value. If the funds faced an illiquid market for their own holdings, it would be much more difficult for them to guarantee liquidity to their own shareholders.

Efforts at reducing credit risk are extremely varied. Credit risk has been reduced by various types of credit enhancements, ranging from establishing trusts with collateral, to having larger institutions or more financially sound institutions guaranteeing the obligations of a more risky issuing entity, to limiting investments to those investigated and rated highly by others (such as S&P investment grade ratings), to imposing legal covenants and restrictions on the issuer designed to maintain credit-worthiness and, of course, the best credit enhancer of all, a direct or indirect U.S. government guarantee (such as the government guarantee in connection with federally-insured banks and savings institution deposits). These measures, to the extent credit risk is perceived as a major issue, are reasonably successful, even if, at times, they are not well priced. Of course, credit risk is also reduced somewhat by size, the larger and more profitable a firm, generally the less risky; and by the firm's own mix of businesses so that it may be less susceptible to a downturn in any one business area and thereby be less risky than if it was concentrated and focussed in just one business.

As discussed, firms embody a variety of firm specific risks. In addition to these mechanisms for reducing the credit/default type, liquidity and other risk associated with a specific firm, it has been generally well known and accepted that an investor can reduce firm specific risk—but not market risk—with regard to securities by creating a portfolio that is diversified.

Mutual funds have increasingly been the vehicle of choice through which smaller investors' have diversified their investments, but such funds have a number of significant disadvantages as compared to acquiring direct ownership of the securities themselves. (U.S. patent applications Ser. Nos. 09/038,158 and 09/139,020 filed by the same inventor discuss in detail the disadvantages of mutual funds, which applications are hereby incorporated by reference in their entirety, including the drawings, as if repeated herein.) Nevertheless, market risk in a portfolio of equities, for example, is not eliminated, even when diversification, whether through funds or in a directly-owned diversified portfolio, reduces or eliminates firm specific risk.

Consequently, a vast number of products, services and techniques have been developed in attempts to reduce (as opposed to avoid) market risk. An example of such a product, service and technique is hedging—such as buying put options on an index to hedge against decreases in value in a portfolio that reasonably matches the index (such as by using a LEAP that provides some protection for up to three years on various stocks or indices).

An example of a service combined with a technique was "portfolio insurance" which was a failed attempt to reduce risk by selling futures on a basket that reflected the ownership of the underlying securities to place, in essence, a stop limit on the expected decrease in value of the portfolio. All these mechanisms generally involve short-term actions, great sophistication, high costs for small portfolios and are not available as cost-effective solutions to decrease market risk over the long-term for smaller investors.

Other mechanisms, however, have been developed that are useful for smaller investors to reduce various types of market-related risk over the longer-term. One example of these mechanisms includes instruments that contain economic adjustments, such as resets of interest rates or conversion features to try to maintain some specified value when market rates change. Another example of such a mechanism is a guaranteed investment contract (similar to a bond, but redeemable at any time or at particular windows at par so that it has no market risk). Another example of such a mechanism is a "real rate" bond that is issued by the U.S. Treasury that provides an inflation-adjusted return and carries no credit, liquidity or market risk. Still another example of these mechanisms is a vehicle like Merrill Lynch's Market Index Target Term Security (MITTS®) (described more below). Finally, another example of these mechanisms is a mutual fund that attempts to cushion against market risk by balancing its portfolio with bonds, cash and other assets expected to have lower market risk. Still another example, is a program offered by Prudential Insurance and Prudential Securities where an investor purchases one of various selected Prudential managed mutual funds and then purchases life insurance. When the investor dies, the life insurance makes up any reduction in value in the selected mutual fund investment. This program is similar to programs where an investor or an insured obtains life insurance to pay a mortgage amount or other amount. All of these investment vehicles or systems are specific alternative investments for investors or have certain limitations (such as the investor must die), not products, systems or methods for a small investor to decrease the risk of an investor-selected or already owned portfolio.

The MITTS-type of security is issued by an entity, such as a brokerage like Merrill Lynch or a bank or an insurance company, and works as follows: The security will be issued for a specified price—such as $10 per share. The security is then guaranteed to pay a minimum specified price, usually the initial offering price ($10 here) at some point in the future, such as five years from the date of original issue. In that regard, it is just like a five-year note with the specified repayment of principal. But in addition to paying the principal, and in lieu of paying interest during the term of the note or at the end, the instrument pays a "supplemental payment." That payment is a specified amount, such as a percentage of the increase in a specified stock index (e.g., the S&P 500), during the term of the security. Consequently, if the security is paying "75% of the percentage increase in the index", then at the maturity of the security if the index has doubled (up 100%) the holder would receive principal of $10 plus a supplemental payment of $7.50 ($10 times 75% of 100%). If the index had decreased or remained unchanged the holder would receive the guaranteed $10.

Some other possibilities exist, for example, other different possible indices can be chosen, or the security could even be linked to just one other security. Moreover, supplemental payments could include any percentage, including a percentage in excess of 100%, with various minimums or maximums on the supplemental payment. Furthermore, the security could be sold at more than par when issued thereby resulting in potential, but limited, losses, etc.

These instruments have a variety of disadvantages:

All these instruments are distinct securities. In order to provide liquidity for the holder, they must be standardized and listed and traded on various exchanges. Consequently, although there are an unlimited number of variants for these types of securities, and in fact there are many of them currently outstanding, they are limited to those issued by sponsors who will engage in the effort and the expense of registering, listing and selling them to the public.

Since these instruments must be bought, an investor must either have cash that was uninvested or be willing to sell some other investments to raise the cash to acquire these securities.

These securities typically do not provide for any flow-through of dividends, or voting rights.

Because they are traded, they have a current—and changing—market value during their term. Although they are guaranteed as to their minimum payout at the end of their term, their value fluctuates during their term. As an example, an instrument that is linked to an index that is currently materially below its reference level (if the reference level were 100, the current level could be, say, 75) will trade at a discount to its par value, such as $8 in the above example, because the instrument might reasonably be expected to pay only $10 in a few years and a reasonable investor would not pay more than $8 now for the right to receive only $10 in a few years. Consequently, an investor who wishes to sell the instrument now will lose $2 (20% of her investment).

Similarly, the instrument could be trading at a current premium, such as $12, if for example, the index has performed well to date (say at 110 where the reference level was 100). In that instance, any new purchaser of the unit will be incurring some risk of loss. For example, if the index at maturity decreases below the reference level of 100, she will receive only $10, for a loss of $2, although her loss is capped at that $2 amount because she will receive at least $10.

These instruments do not enjoy favorable tax treatment. Returns earned by investors are ordinary interest income, even if the security is sold prior to maturity, and tax will generally be levied on imputed income annually, even though the cash is usually paid only at maturity. Consequently, these instruments are useful almost exclusively for tax-favored accounts, like retirement accounts. Of course, those are precisely the accounts where investors can incur greater levels of risk because they are usually longer-term investments, and where this type of security is less necessary.

Since these instruments are sold as securities, through brokers, commissions are levied.

Finally, again, these are separate instruments for investing, they are not methods or systems that can be used to reduce the market risk in an already existing portfolio of securities.

Most of these disadvantages are shared by the other existing methods of limiting downside risk described above. For these reasons, among others, these alternatives have not been that useful or popular for investors in reducing their downside risk exposure to the marketplace. Therefore, investors who are concerned about the stability and volatility of the marketplace sometimes sell their equity portfolios when the market is unstable. Other investors who know they should invest in the market in order to obtain the returns they would like to achieve over the long term may nevertheless invest less in the market than they otherwise would, even when the market is stable, out of concern that the market, and therefore their investments, will decrease in value. If investors were insured against some of the downside risk in investing in these risky assets, they would find it easier to maintain their current investment portfolios in light of market instability. Under such circumstances, investors might even increase the percentage of their portfolios allocated to riskier assets even when the market is unstable.

Unfortunately however, to date, it has been impossible, on a cost-effective basis, to price a hedge for a small portfolio on a dynamic basis and provide the interactivity necessary for the hedge to be useful to a smaller investor. There has not been the embodiment in a computer-and-Internet-based system of a whole new product that allows for the creation of a hedged portfolio resulting in a smaller investor being able to limit the downside risk of an existing portfolio of investments.

The present invention is therefore directed to the problem of developing a method and system for providing a smaller investor with a portfolio of investments a way to manage the risk underlying the investor's portfolio.

SUMMARY OF THE INVENTION

The present invention solves this problem by combining a graphical or other user interface accessible by the investor over the Internet or through an intermediary with a computational pricing mechanism that examines an investor's current portfolio's expected risk, prices the expected risk, and transfers to a third party all or some of either that precise expected portfolio risk or some other more general or different risk, such as overall market risk as reflected in an index like the S&P 500. The third party may be the system operator. The transfer is in exchange for consideration, which can be either cash, other property or part of the opportunity cost forgone in connection with the portfolio.

According to the present invention, a computer-based system for managing risk underlying a portfolio of assets/liabilities, includes a graphical user interface, a memory (with a custodial feature), a processor and a link to the party incurring the risk, which could include the public markets through publicly traded hedging devices such as puts and calls. The graphical user interface enables the user to enter information about the portfolio, including a list of assets/liabilities, values for each of the assets/liabilities, shares owned or a percentage of each issue as part of the entire portfolio, and an input of what the user wishes to have limited for downside risk ("shielded or protected"). The memory with the custodial feature stores the portfolio to be shielded. The processor analyzes the portfolio using, among other known techniques, value-at-risk and sensitivity algorithms and probabilistic analysis to determine an expected likelihood of a catastrophic loss in value at a plurality of specified levels and a likely distribution of outcomes for the portfolio over specified periods, and can also calculate the cost of hedging the risk through the purchase of instruments traded in the public markets. Furthermore, the processor provides a series of choices to the user via the graphical user interface to select: (i) a time period or periods for which the user seeks shielding from market risk for the portfolio, (ii) a degree of market risk protection, said processor pricing the requested shielding including by reviewing the cost of hedging, and (iii) a menu of pricing mechanisms. The linkage to the third party incurring the risk can be an internal linkage if the system operator will be incurring the risk directly, or to an independent third party such as an insurance company, a hedge fund, or another party that is incurring the risk (including the public markets if the risk is hedged through publicly traded instruments), etc.

According to the present invention, the portfolio to be shielded for the investor can be a portfolio that is devised by the computer-based system and executed and transacted for the user, or is separately transferred to the system from another brokerage, bank or intermediary, or is otherwise transferred by the user to the system.

According to another aspect of the present invention, the degree of market risk protection that an investor can select would include full protection, partial protection, excess protection, indexed protection or variations in between or any combination thereof. Full protection means no decrease in value from the current value. Partial protection means no more than a specifiable decrease, such as 10%, in value from a current value. Excess protection means that the portfolio value will increase in value and provide at least a specified return, which could be either a specified rate such as the nominal inflation rate, or the real inflation rate on a going forward basis (in other words, whatever the inflation rate is over the specified period for which the shielding is in effect), or reflecting a specifiable dollar or percentage amount that is specified and fixed at the time the shield is acquired. Indexed protection means protection limited by, relative to or otherwise related to, an index, which could be a single other security, a customized group of securities or a standardized index like the S&P 500.

According to the present invention, the processor prices the shielding in a variety of different manners. As described more fully below, the variety of pricing manners includes for a shield to be provided over a specifiable term: (i) a dollar amount payable at the time of obtaining the shield or payable at the end of the shield period or at other times in between, (ii) a percentage (including a variable percentage) of any portfolio value increase (or increase relative to an index or some other value) over the specified period (a "vertical slice" or assignment), wherein if the portfolio does not increase in value, the user owes nothing (but still receives the requested protection so that if the portfolio value is not at least at the level specified by the shield the user is shielded and receives whatever amount is necessary to bring the portfolio value back to the shielded value), but if the portfolio increases in value the agreed-upon specified percentage or amount of the portfolio value increase is paid as the premium for the shield, (iii) an amount over or within some specifiable level of return (a "horizontal slice" or assignment) that would otherwise work similarly as in (ii), or various combinations of (i), (ii) and (iii).

According to another aspect of the present invention, the graphical user interface receives input from the user regarding the protection desired and the payment method, and the securities shielded are then held in the memory with the custodial feature.

According to yet another aspect of the present invention, the system links with a third party willing to incur the risk of shielding the user portfolios and either provides information to the third party as it is received from users so that the processor remains resident at the third party, or obtains information from the third party as to the third party's charges for ranges of shields and uses that information to price the shields (so that the processor remains resident with the system operator).

According to yet another aspect of the present invention, the system linkage is with multiple third parties who provide competing quotes for their willingness to shield specific user portfolios so that the user can obtain the best price for the shielding and with market makers and others offering publicly traded instruments that could be used to create a dynamic hedge for the system operator to shield the portfolio.

According to another aspect of the present invention, the dividends paid on the securities in the portfolio and cash on securities that are cashed out in acquisitions are either payable to the user or reinvested in the portfolio pro rata with slight pricing differences depending on which pricing and what shield option the user selected.

According to yet another aspect of the present invention, if the user wishes to sell a part of the portfolio pro rata but otherwise wishes to maintain the balance of the portfolio, then depending on which payment mechanism the user selected, the user may either be refunded some of the premium paid, have to pay some of the returns to date, and/or be charged a dollar amount as a deferred premium.

According to yet another aspect of the present invention, if the user wishes to sell selected securities in the portfolio, and thereby change the mix in the portfolio, the processor either: (i) re-prices the remaining shield on the new portfolio and calculates a differential, (ii) advises the user via the graphical user interface to replace the sold security with another security with sufficiently similar portfolio characteristics, and provides a list of such securities, or (iii) terminates the shield outputting a required payment amount to the user via the graphical user interface.

According to the present invention, a method for managing risk underlying a portfolio of assets/liabilities, includes the steps of: a) receiving information about the portfolio from a user, including a list of assets/liabilities, current market values for each of the assets/liabilities, amount of each asset/liability (e.g., shares owned or a percentage of each issue as part of the entire portfolio), and an input of what the user wishes to have limited for downside risk ("shielded or protected"); b) storing the portfolio to be shielded; c) analyzing the portfolio using value-at-risk and sensitivity algorithms and probabilistic analysis to determine an expected likelihood of a catastrophic loss in value at a plurality of specified levels and a likely distribution of outcomes for the portfolio over specified periods or calculating the cost of shielding the portfolio through publicly traded instruments; d) providing a series of choices to the user via the graphical user interface to select: (i) a time period or periods for which the user seeks shielding from market risk for the portfolio, and (ii) a degree of market risk protection; and e) pricing the requested shielding and providing said pricing to the user.

DETAILED DESCRIPTION

The below described method and system is a computer-implemented system that reduces market risk for a specified portfolio, by examining the expected portfolio risk, pricing the expected risk, and transferring the expected risk or related market risk in exchange for consideration, which can be in the form of cash, other property, or future returns, such as an assignment of various portions or parts of the portfolio or the potential increase in value of the portfolio. By enabling a smaller investor to reduce risk, the present invention provides both the advantages of owning a diversified portfolio of securities (as outlined in the above-incorporated-by-reference patent applications) and controlling the amount of risk inherent in the selected portfolio.

Figure 1:
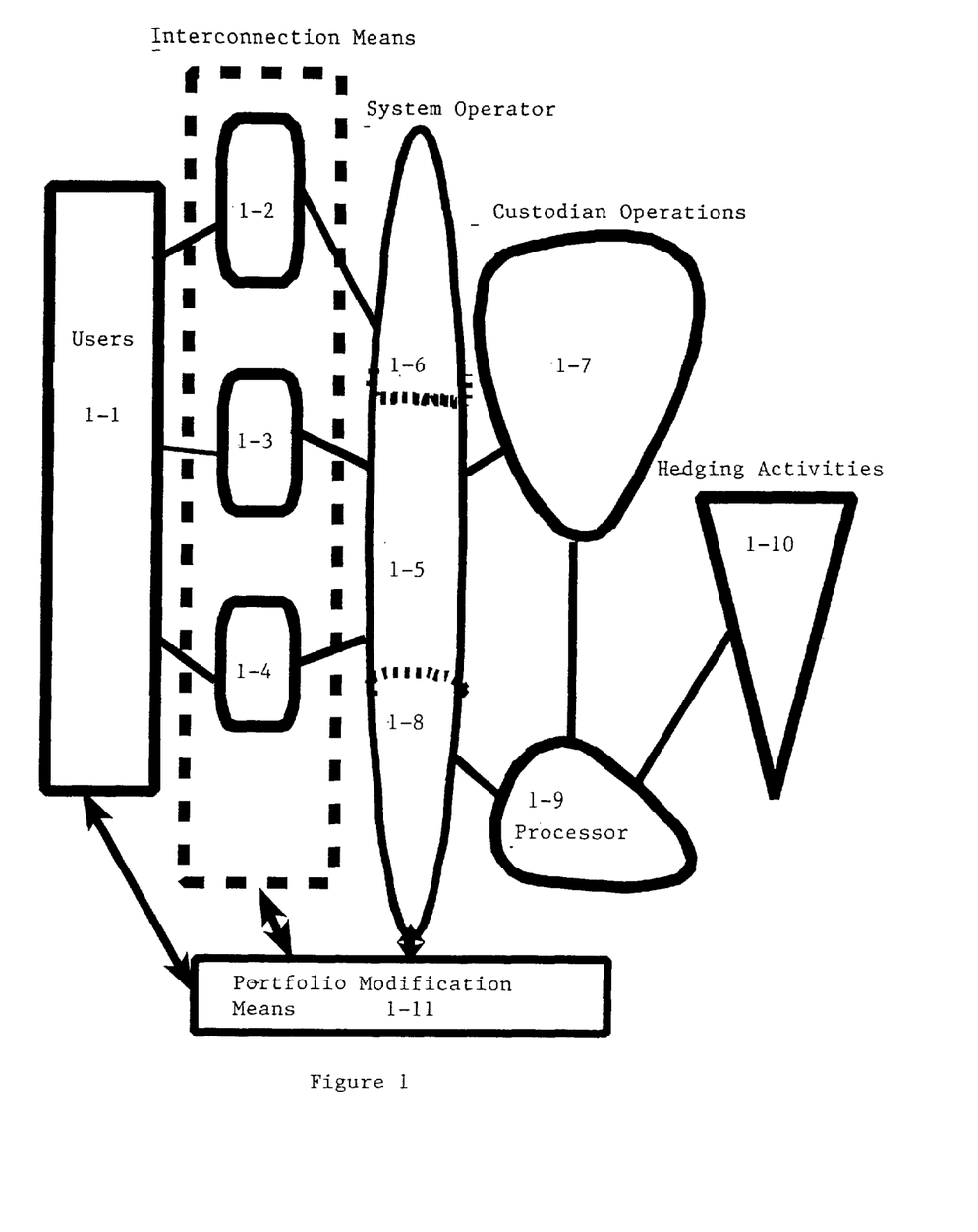
FIG. 1 depicts an exemplary embodiment in block diagram format of the system of the present invention.

Referring to FIG. 1, a user (1-1) accesses the computer-based system (1-5) through a variety of communications systems, such as the Internet (1-2) or any other computer network, or via third parties, such as a broker, bank or other intermediary(1-3), or other known communications devices, such as direct dial-up modem (1-4). The exemplary embodiment of the system of the present invention is associated with a custodial operation (1-7), examples of which are the system operator itself if it is a bank, or a broker or some other type of custodian that can hold the relevant assets/liabilities or an entity that is linked with the system operator that functions as the custodian (1-7). The system is also associated with a processor (1-8) which can be located at the bank, broker or other entity acting as the custodian, or could be linked with one or more independent third parties (1-9) such as an insurance company, hedge fund or other entity that is acting as the counterparty to the shield contract. The counterparty could then be engaged in a variety of hedging transactions (1-10) that it enters on its own to reduce its risk and exposure to whatever level it deems appropriate. The counterparty here could also be the system operator itself, which could engage in all the functions of custodian, system operator and counterparty. The portfolios of the user could also be modified (1-11) by the user or the system operator or by any intermediary (in 1-3) through the computer-based system described in the earlier mentioned patent application (which has been incorporated by reference) or otherwise.

Figure 2:
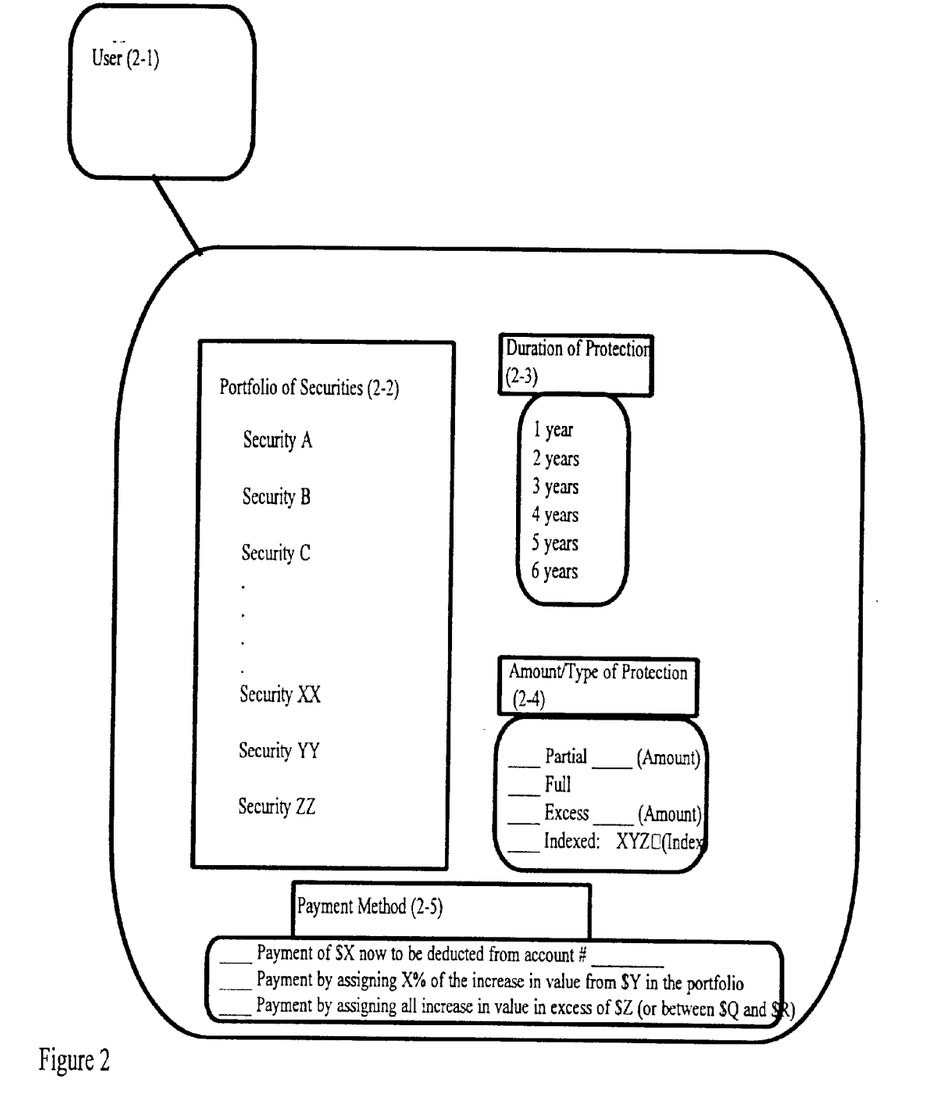
FIG. 2 depicts an exemplary embodiment of a graphical user interface used in the system of the present invention.

Referring to FIG. 2, in employing the invention, a user (2-1) will select a portfolio of securities to be protected (2-2), such as 40 stocks in varying percentages, the duration for the protection (2-3), such as 3½, 5 and/or 7 years, the amount of protection (2-4), such as no downside risk so that at the end of the selected period(s) the portfolio would have at least its current value, and the method of payment (2-5), such as forgoing a specified percentage of the upside potential.

More specifically, the present invention operates as follows:

1. The user enters information about the user's portfolio—such as a list of equities, with dollar amounts, shares owned or the percentage of each issue as part of the entire portfolio—so that the computer-based system is provided the input of what the user wishes to have limited for downside risk ("shielded or protected").

a) The account to be shielded could have been devised by the computer-based system described in the earlier mentioned patent application (which has been incorporated by reference), could have been executed and transacted for the user as per such application even if not devised by the system, or could be separately transferred to the system from another brokerage, bank or intermediary or from the user transferring the securities to the system or could be a hypothetical or "virtual" portfolio created by the user that does not represent any securities actually owned by the user (or is partially a hypothetical or virtual portfolio and partially an owned portfolio).

b) The portfolio securities to be shielded can be held by the system, or can be held by another third party such as a bank or depositary or any other trusted custodian, or can simply be noted and stored as selected securities (regardless of whether they are owned or not by the user) so as to allow the user to obtain a shield assuming the user did own such securities (thereby permitting the user to go "short" the portfolio and have a shield on the short position, or use the portfolio to shield against other activities that may be correlated with the portfolio, etc.).

Figure 3:
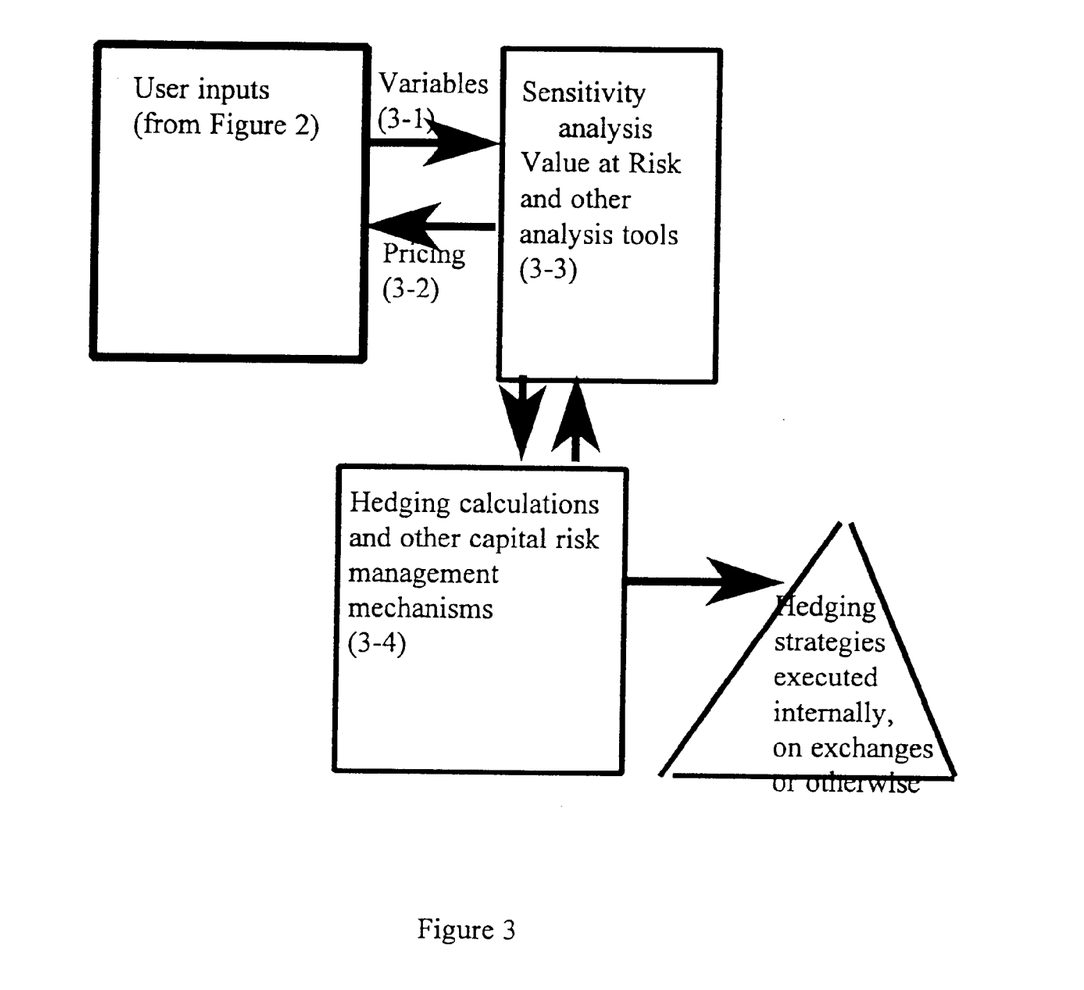
FIG. 3 depicts a block diagram of an exemplary method of the present invention.

2. The portfolio is then analyzed to determine the price to charge the user (see FIG. 3). For example, the portfolio is analyzed using known value-at-risk and sensitivity algorithms and probabilistic analysis to determine the expected likelihood of a catastrophic loss in value at specified levels and the likely distribution of outcomes for the portfolio over specified periods given historical volatility, returns, distribution around the mean expected returns and risk levels and other factors, and can be analyzed by calculating the cost to shield the portfolio utilizing publicly traded instruments.

a) For example, the system analyzes the portfolio to determine what the expected value would be over the specified periods (here, 3½, 5 and 7 years). The system also analyzes the portfolio to determine what the value of the portfolio is likely to be within certain ranges of probability.

b) In most instances, the probability distributions will appear similar to a bell-shaped curve, with a median value equal to the historic long-term returns on such a portfolio and with tails in the distribution reflecting possible but less likely returns. All this analysis is known and part of various capital asset pricing models, modern portfolio theory models, value-at-risk and sensitivity models used for valuing portfolios of securities, derivatives and other instruments, etc. In addition, dynamic hedging techniques that can utilize publicly traded instruments are also known. Finally, a system operator or third party incurring the risk of loss can aggregate the user's selected portfolio with the portfolios of others (which combined portfolio may have different characteristics and be less expensive to shield then any single portfolio), and then shield the combined portfolio, through any of the means described above.

3. The computer-based system then provides a series of choices to the user.

a) The user selects the time period or periods for which he seeks shielding from market risk for the portfolio, such as 5 years, or 3½ and 5 years.

b) The user selects the degree of market risk protection such as:
      i) Full protection (no decrease in value from the current value);
      ii) Partial protection (no more than a specified decrease in value from the current value, which can be specified either in terms of dollars (e.g., if the current portfolio is worth $25,000, that it be worth no less than $20,000), or a percentage (e.g., not less than 80% of the current amount);
      iii) Excess protection (that there be at least some return reflecting a specified inflation rate, or reflecting the real inflation rate as it might be over the time period, or reflecting a specified dollar or percentage amount (e.g., that the portfolio be worth at least $30,000, or increase at least 20%, over the time period); or
      iv) Indexed protection (that there be protection based on the movement of some index, such as the Dow Jones Industrial Average or the S&P 500, such that if there is a decline in the index and a decline in the portfolio then the portfolio is protected (x) to the extent of the decline in the index relative to the decline in the portfolio, or (y) to the extent of the decline in the index (as an example: if a user selected the first option (x) and the user's portfolio declined 8% when the index selected declined 4%, then the user would be protected for half of the decrease in the portfolio's value; if the portfolio had declined only 2%, then the user would be protected for the full 4% decline in the index's value (and thereby obtain some additional return), if the user had selected the second option (y) then the user would be protected dollar for dollar to the extent of a 4% decline, but no more); or
      (v) a combination of the above.

4. The computer-based system then prices the requested shielding in a variety of different manners, such as, for a 5 year full protection shield on a $25,000 portfolio and refer that amount to the user (who could select to proceed with the transaction through the interfaces described in FIG. 1) and which would be displayed through a graphical method such as that depicted in FIG. 4:

a) A dollar amount (i) at the commencement of the shield (e.g., $4,000 payable at the time of obtaining the shield), or (ii) at the termination of the shield (e.g., $6,000 payable at the end of the 5 year shield period).

b) A percentage of any increase in the portfolio's value over the relevant time frame (e.g., the user will have to forego 25% of any increase in value of his portfolio, in other words the user will have assigned to the system operator one-quarter of the portfolio's potential increase in value, over the specified period), so that if the value of the portfolio in five years is $45,000 (a $20,000 increase), the user would receive $40,000 and the system insurer would receive $5,000). If the portfolio does not increase in value, the user owes nothing and receives the downside protection so that if the portfolio decreases in value the user is fully shielded and receives whatever amount is necessary to bring the portfolio value back to $25,000.

c) An amount over some specified level (the user will have to forego all increase in value of his portfolio in excess of $35,000) or an amount within a certain level (the user will have to forgo all increase in value of his portfolio between $27,500 and $33,000, but receives the first $2,500 increase and any increase above $33,000).

d) Or various combinations of the above.

The ability to price the shield utilizing only a "slice" of the upside potential can be understood from an example.

i) Assume a user were willing to forego 100% of the upside on a portfolio for a period such as 5 years, in exchange for a guarantee that the portfolio would be worth at least as much as it was today. If the portfolio is a reasonably diversified one consisting of publicly traded securities, the likelihood that the portfolio will not increase in value over five years exists, but it is small. But the value of all the appreciation in such a portfolio over such a period is high. Looking at it differently, this transaction would be the equivalent, for the user, of the insurer selling the user's portfolio for cash at the time of providing the insurance and investing the proceeds in a five-year Treasury note, so principal is guaranteed to be repaid, but the interest is all retained by the insurer. Clearly, this is a deal that is beneficial for the insurer, but not the user.

ii) By contrast, if the user wished to maintain 100% of the upside with the same protection, the writer of the insurance would need to be paid something for providing it—otherwise the insurer is providing something for nothing.

iii) Obviously, there is some point between retaining none of the upside and 100% of the upside where the insurer and the user become relatively indifferent regarding the cost of the insurance. Pricing near but below that point provides a service to users and a return for the insurer.

Figure 4:
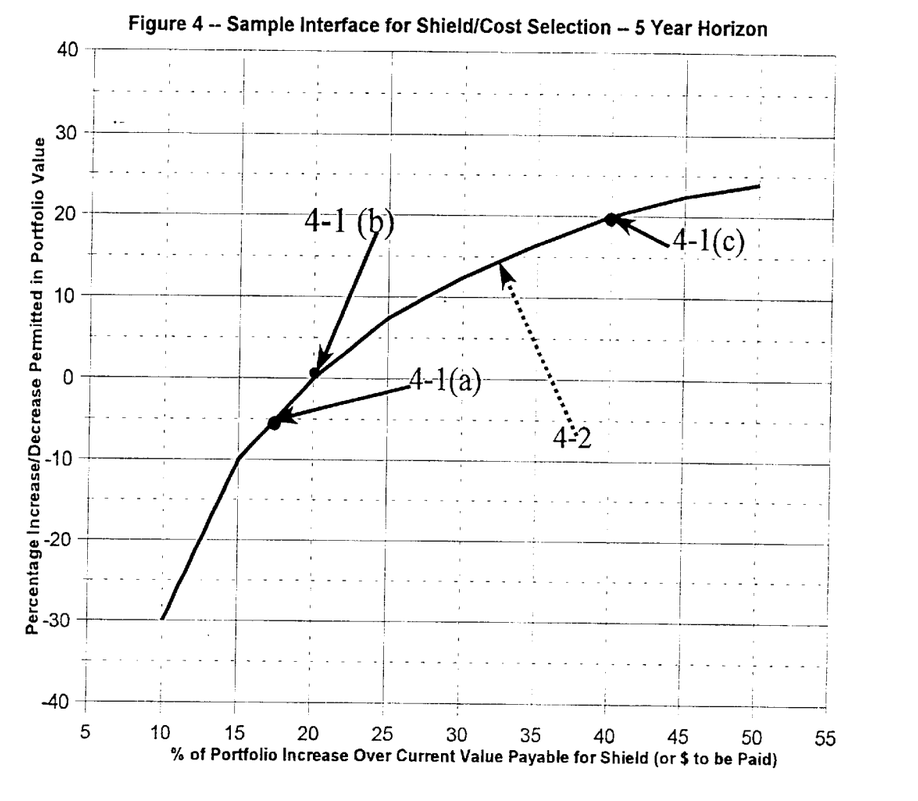
FIG. 4 depicts an exemplary embodiment of a graphical user interface for displaying the possible shielding for a portfolio and the cost associated with it depending on a user choice for payment according to the present invention.

5. The user would then select the specific amount of protection desired which could be selected through clicking on a point (4-1(a)–(c)) on a chart (FIG. 4) showing available options (4-2) after selecting the general parameters (such as shield for five years as opposed to a shield for seven years) and the payment method (2-5), and the securities shielded would be held in the system or the third party custodial arrangement. For example, FIG. 4 shows the cost and shielding available at five years from the current date on a selected portfolio, with 4-1(a) showing that if the user is willing to forgo 17.5% of the potential upside the user will be assured that the portfolio will be worth at least 95% of its current value in five years; similarly, at 4-1(b), the user would experience no loss in value if 20% of the upside were forgone, and the user could receive a guarantee that the portfolio would be worth 120% of its current value at the end of five years if the user were willing to forego 40% of the portfolio's potential increase in value over that period (which, of course, will reduce somewhat the realizable gains to the user).

a) Dividends paid on the securities in the portfolio (and cash on securities that are cashed out in acquisitions) would either be payable to the user or reinvested in the portfolio pro rata (with slight pricing differences depending on which option the user selected).

b) In the event the user wishes to sell a part of the portfolio pro rata—such as 10% of the portfolio—but otherwise wishes to maintain the balance of the portfolio, then depending on which payment mechanism the user selected, the user may either be refunded some of the premium paid (if 4a(i) above was selected), have to pay some of the returns to date (if 4b was selected) or be charged a dollar amount as a deferred premium (if 4a(ii) or 4c were selected).

c) In the event the user wishes to sell selected securities in the portfolio, and thereby change the mix in the portfolio, the system can re-price the remaining shield on the new portfolio and charge a differential, the user can replace the sold security with another security with sufficiently similar portfolio characteristics, or the shield can be terminated with payments based on b) above.

Value-At Risk and Sensitivity Analysis

A discussion of value-at risk and sensitivity analysis can be found at http://www.sec.gov/rules/final/33-7386.txt, which discusses the Security and Exchange Commission accounting disclosure policies. The paper is entitled "Disclosure of Accounting Policies for Derivative Financial Instruments and Derivative Commodity Instruments and Disclosure of Quantitative and Qualitative Information about Market Risk Inherent in Derivative Financial Instruments, Other Financial Instruments, and Derivative Commodity Instruments." Securities and Exchange Commission, 17 C.F.R. Parts 210, 228, 229, 239, 240, and 249 [Release Nos. 33-7386; 34-38223; IC-22487; FR-48; International Series No. 1047; File No. S7-35-95] (Jan. 31, 1997).

The term "sensitivity analysis" as used herein describes a general class of models that assesses the risk of loss in market risk sensitive instruments based on hypothetical changes in market rates or prices. The term sensitivity analysis is not meant to refer to any one model for quantifying market risk. Sensitivity analysis models include, for example, duration analysis or other "sensitivity" measures already required to be calculated for regulatory purposes for thrift institutions (see Office of Thrift Supervision, Regulatory Capital: Interest Rate Risk Component, 12 C.F.R. §567.5(c)(4) (August 1993)).

The term "value at risk" as used herein describes a general class of models that provides a probabilistic assessment of the risk of loss in market risk sensitive instruments. The term value at risk is not meant to refer to any one model for quantifying market risk. Value at risk models can be adapted to non-trading activities as well as trading activities and to non-financial institutions as well as financial institutions, depending on the model and assumptions of the user.

The primary differences between the value at risk and sensitivity analysis alternatives are (i) value at risk analysis reports the potential loss arising from equally likely market movements across instruments, while sensitivity analysis reports the potential loss arising from hypothetical market movements with differing likelihoods of occurrence across instruments and (ii) value at risk explicitly adjusts the potential loss to reflect correlations between market movements, while sensitivity analysis is not designed explicitly to make such adjustments.

Alternative Embodiment

Another application for the present invention is using a representative portfolio of securities as surrogate for another investment for which the user desires to insure the value. In certain situations there may be no current way to insure cost-effectively the value of an investment, such as real estate, a privately held company, etc. Nevertheless, an investor may wish to find some way to hedge his or her investment in these properties. To do so using the present invention, an investor must identify some correlation of their existing investment to publicly traded securities. Once these are identified, the investor then purchases a shield against the drop in value of these securities. Thus, as the property declines in value, so too, hopefully, will the identified securities. In this case, by purchasing the shield from the system of the present invention, the investor will then be able to make up at least some of the decline in value of the property correlated with the identified securities.

For example, assume there is some correlation between values of stocks of companies in a particular geographic location and the real estate market in that region. As the fortunes of the company improve, the number of employees employed by these companies increases causing an increase in the price of real estate. More importantly, as the fortunes of these companies decline, employees are either not hired, causing a stagnation in real estate, or employees are let go, causing a decline in the value of real estate. The present invention enables a user to insure or provide for some hedge in his real estate investments in a given locality by creating a "virtual" portfolio of securities in several representative companies and submitting the portfolio to the present invention for insurance against a decrease in value. Although the investor does not actually own the securities, the present invention still returns a value to make up for the loss in the value of the securities based on a prior value of those securities.

A more concrete example might be a user who owns real estate in Silicon Valley. By creating a portfolio of securities spread among companies who have large numbers of employees in Silicon Valley, the investor can purchase insurance against the representative portfolio even without actually owning these securities. The end result is that the investor now has a hedge against these securities, which in turn have some relatively high correlation to the value of real estate in Silicon Valley.

Many other applications are possible, and are limited only by the imagination of the users. For example, a user who owns significant stock in a privately held company whose fortunes are tied to the price of oil, may be able to hedge his holdings in the privately held company by purchasing a hedge against a portfolio of oil and oil-related companies, or against a portfolio of oil-based publicly-traded commodities.

The general concept is that the user would create a portfolio of securities, but not actually purchase them, which have some correlation to the actual investment the investor wishes to protect. Then, the investor submits the "portfolio" to the shielding program of the present invention to obtain the desired shield. The insurer does not care whether the user actually owns the securities, but merely requires payment for the shield. This technique is significantly less costly than purchasing puts or shorts on multiple securities. Moreover, this technique permits shields to be purchased for time periods that are not necessarily available in puts or shorts.

SUMMARY

The computer-implemented invention has numerous advantages over the existing products:

- It allows a user to specify the portfolio to be protected—and to obtain protection for an existing portfolio—without having to attempt to find an instrument or combination of instruments, or mutual funds, that will match, or attempt to match the characteristics of the portfolio.
- It provides superior tax treatment, with the treatment being more like acquiring insurance, or perhaps a put, as opposed to an original issue discount security (like a MITTS).
- It allows for the user to select different payment mechanisms for the insurance, including those that require no cash outlay.
- It does not require the user to die to obtain the benefit, and the user can obtain the benefits of the shield during the user's lifetime (or even over a short time period).
- It allows smaller users to obtain the protection with an easy to use interface.
- It allows a user to specify the precise level of downside protection the user wishes, including the duration of the protection.
- It allows the user to retain and exercise voting rights, and to have the benefit of dividends and other distributions on a current basis.
- The user can modify his portfolio at will, although there may be a requirement that the user compensate for any term of insurance already passed.
- Similar to techniques that require a purchase of a particular security, such as an option, to cover a specific security in a portfolio or an entire portfolio, the security or portfolio being protected does change in value. Consequently, if the portfolio decreases in value during the term for which protection is sought, the user must maintain his portfolio and the insurance if he wishes to be sure that at the specified time the portfolio would have the value contracted for. However, unlike the MITTS, or insurance tied to a death benefit, a user could acquire a series of downside protections (such as at 3½, 5 and 7 years) for a given portfolio, thereby ensuring that the portfolio would have specified value during various maturity windows.

Finally, although the description of the application of the invention above utilizes securities, the invention could be applied to any series of assets or liabilities that have volatile returns and market or other risks that can be priced. As used herein, risks and returns refer to absolute levels of risk (the risk that an asset would decrease in value, or decrease in value relative to real or nominal inflation), relative risk (the risk that an asset would decrease in value relative to an index or the market or some other independent variable that fluctuates itself), risk that encompasses volatility (simply, the risk that although the long-term expected result may be known or stable, short-term results are variable), or other types of risk.

As used herein, assets/liabilities include any of the following: foreign or domestic securities, equities, options, warrants, mutual fund shares, commodities, bonds, notes, bills, derivatives, tradable assets or liabilities or any combination thereof, financial assets, limited partnership interests, private placement securities, foreign currencies, contracts, futures, bank loan syndication interests, debts, pollution rights, global warming rights, and insurance claim interests.

What is claimed is:

1. A computer-based system for enabling an individual investor to manage risk underlying a portfolio of securities, said computer-based system comprising:

a) a graphical user interface prompting a user for information regarding the portfolio, said information including a list of assets/liabilities in the portfolio to be protected and a corresponding amount of each of the assets/liabilities held in the portfolio;

b) a memory storing the portfolio and the information regarding the portfolio; and c) a processor being coupled to the memory and the graphical user interface and analyzing the portfolio to determine a price to charge the user to insure the value of the portfolio at a predetermined level at a predetermined time.

2. The system according to claim 1, wherein the predetermined level at which the value of the portfolio is insured includes a user specifiable level.

3. The system according to claim 1, wherein the predetermined level at which the value of the portfolio is insured includes a plurality of predetermined levels.

4. The system according to claim 1, wherein the predetermined level at which the value of the portfolio is insured includes a plurality of user specifiable levels.

5. The system according to claim 1, wherein the predetermined time includes a user specifiable time.

6. The system according to claim 1, wherein the predetermined time at which the value of the portfolio is insured includes a plurality of predetermined times.

7. The system according to claim 1, wherein the predetermined time at which the value of the portfolio is insured includes a plurality of user specifiable times.

8. The system according to claim 1, wherein the predetermined level at which the value of the portfolio is insured includes a level above a current value.

9. The system according to claim 1, wherein the predetermined level at which the value of the portfolio is insured includes a level below a current value.

10. The system according to claim 1, wherein the processor calculates the expected value of the portfolio at the predetermined time and a distribution of values of the portfolio at the predetermined time to determine the price to charge the user.

11. The system according to claim 1, wherein the processor uses value at risk analysis to determine the price to charge the user.

12. The system according to claim 1, wherein the processor uses sensitivity analysis to determine the price to charge the user.

13. The system according to claim 1, wherein the processor determines the price to charge the user using at least one selected from the list of: (i) value at risk analysis; (ii) sensitivity analysis; and (iii) the cost of hedging the portfolio using dynamic hedging techniques and publicly-traded or other instruments.

14. The system according to claim 1, further comprising a communications interface being coupled to the processor and for coupling to a communications network via which the processor receives from a third party the portfolio to be shielded from risk.

15. The system according to claim 1, further comprising a communications interface being coupled to the processor and for coupling to a communications network via which the processor receives from the user the portfolio to be shielded from risk.

16. The system according to claim 1, wherein the processor provides a varying degree of market risk protection for the portfolio to be shielded.

17. The system according to claim 16, wherein the varying degree of market risk protection includes at least one selected from the list of:

a) full protection, wherein the portfolio is protected against a decrease in value from a current value;

b) partial protection, wherein the portfolio is protected against no more than a specifiable decrease in value from a current value;

c) excess protection, wherein the portfolio is guaranteed at least some return reflecting a specified inflation rate;

d) excess protection, wherein the portfolio is guaranteed at least some return reflecting a specifiable dollar or percentage amount;

e) excess protection, wherein the portfolio is guaranteed at least some return reflecting a real or a nominal inflation rate predicted or observed over a specifiable future time period; and f) indexed protection, wherein the portfolio's value and the protection afforded is tied to changes in a selected index.

18. The system according to claim 1, wherein the processor provides the user via the graphical user interface a plurality of options for pricing shielding of the portfolio.

19. The system according to claim 18, wherein the plurality of options includes at least one selected from the group of:

(i) specifying a dollar amount payable at a time of obtaining or terminating a shield for the predetermined time;

(ii) specifying a percentage of any portfolio value increase over the predetermined time to be paid, wherein if the portfolio does not increase in value, the user owes nothing, if the portfolio decreases in value the user receives an amount necessary to increase the portfolio to a current value; and (iii) specifying an amount over a predetermined level.

20. The system according to claim 1, wherein the processor calculates a refund payable to the user if the user sells a part of the portfolio before the predetermined time.

21. The system according to claim 1, wherein the processor calculates a fee to be paid by the user if the user sells a part of the portfolio.

22. The system according to claim 1, wherein the processor calculates a dollar amount as a deferred premium if the user sells a part of the portfolio.

23. The system according to claim 1, wherein upon a potential modification to the portfolio by the user, the processor reprices a remaining shield on the modified portfolio and calculates a differential if the user wishes to modify the portfolio.

24. The system according to claim 1, wherein the processor advises the user via the graphical user interface to replace a sold security with another security with sufficiently similar portfolio characteristics, and provides a list of such securities to the user.

25. The system according to claim 1, wherein the processor terminates the shield outputting a required payment amount to the user, and deducts the required payment from the portfolio if the user requests or does not otherwise make payment.

26. The system according to claim 1, further comprising a communications interface being coupled to the processor and for coupling to a plurality of third parties, who provide competing quotes for their willingness to shield specific user portfolios, from which a user can select to obtain the best price for the shielding.

27. A computer-based method for enabling an individual investor to manage risk underlying an investment comprising the steps of:

a) creating a representative portfolio of assets/liabilities that have a correlation to the investment for which the individual investor desires to manage risk;

b) submitting the representative portfolio to a computer system over a communications link; and c) analyzing the representative portfolio using a processor to determine a price to charge the user to insure the value of the representative portfolio at a predetermined level at a predetermined time.

28. The computer-based method according to claim 27, further comprising the steps of:

d) prompting the user via a graphical user interface for information about the representative portfolio, said information including a list of assets/liabilities in the representative portfolio to be protected and a corresponding amount of each of the assets/liabilities held in the representative portfolio;

e) storing information regarding the representative portfolio in a computer accessible memory; and f) acquiring the representative portfolio of assets/liabilities with the computer system by placing orders for the asset/liabilities in the representative portfolio with an electronic trading system.

29. The computer-based method according to claim 27, further comprising the steps of:

d) prompting the user via a graphical user interface for information about the representative portfolio, said information including a list of assets/liabilities in the representative portfolio to be protected and a corresponding amount of each of the assets/liabilities in the representative portfolio;

e) storing information regarding the representative portfolio in a computer accessible memory; and f) submitting the representative portfolio of assets/liabilities to the computer system to purchase a shield against the representative portfolio without actually owning the assets/liabilities.

30. A computer-based method for enabling an individual investor to manage risk underlying a portfolio of assets/liabilities comprising the steps of:

a) prompting a user via a graphical user interface for information about the portfolio, said information including a list of assets/liabilities in the portfolio to be protected and a corresponding amount of each of the assets/liabilities held in the portfolio;

b) storing the portfolio and the information regarding the portfolio in a computer accessible memory; and c) analyzing the portfolio using a processor to determine a price to charge the user to insure the value of the portfolio at a predetermined level at a predetermined time.

31. The method according to claim 30, further comprising the step of transferring the portfolio to be shielded separately from a third party.

32. The method according to claim 31, wherein the third party includes one selected from the group of: a brokerage, a bank or an intermediary.

33. The method according to claim 30, further comprising the step of receiving the portfolio to be shielded from the user.

34. The method according to claim 30, further comprising the step of presenting to the user a plurality of shielding options for insuring the portfolio and a corresponding price for each of the plurality of options.

35. The method according to claim 34, wherein the plurality of shielding options includes one selected from the group of: full protection, partial protection, excess protection or indexed protection.

36. The method according to claim 35, wherein full protection comprises guaranteeing no decrease in value from the current value.

37. The method according to claim 35, wherein partial protection comprises guaranteeing no more than a predetermined decrease in value from a current value.

38. The method according to claim 35, wherein excess protection comprises guaranteeing at least some return from a portfolio reflecting a predetermined rate of increase.

39. The method according to claim 35, wherein indexed protection comprises guaranteeing the value of the portfolio relative a change in value of a predetermined index.

40. The method according to claim 35, wherein the plurality of shielding options includes guaranteeing a return relative to a real inflation rate over a predetermined time period.

41. The method according to claim 35, wherein the plurality of shielding options includes guaranteeing a specifiable dollar amount as a return on the portfolio investment.

42. The method according to claim 35, wherein the plurality of shielding options includes guaranteeing a predetermined percentage amount.

43. The method according to claim 30, further comprising the step of presenting a price to the user for the shield in response to a user specifiable term as a dollar amount payable upon obtaining the shield.

44. The method according to claim 30, further comprising the step of presenting a price to the user for the shield as a percentage of any portfolio value increase over a user specified period, wherein if the portfolio does not increase in value, the user owes nothing and if the portfolio decreases in value the user receives whatever amount is necessary to bring the portfolio value back to its current value.

45. The method according to claim 30, further comprising the step of presenting a price to the user for the shield as an amount over some user specified level.

46. The method according to claim 30, further comprising the steps of presenting to the user the option of reinvesting proceeds received from the securities in the portfolio and from securities that are cashed out in acquisitions in the representative portfolio pro rata or receiving the proceeds and presenting to the user pricing differences for each option.

47. The method according to claim 30, further comprising the step of refunding to the user some of the premium paid if the user wishes to sell a part of the portfolio pro rata but otherwise wishes to maintain the balance of the portfolio.

48. The method according to claim 30, further comprising the step of requiring as payment from the user a portion of the returns to date if the user wishes to sell a part of the portfolio pro rata but otherwise wishes to maintain the balance of the portfolio.

49. The method according to claim 30, further comprising the step of charging a dollar amount to the user as a deferred premium if the user wishes to sell a part of the portfolio pro rata but otherwise wishes to maintain the balance of the portfolio.

50. The method according to claim 30, further comprising the step of re-pricing a remaining shield on a new portfolio and calculating a differential if the user wishes to sell selected securities in the portfolio, and thereby change a mix of securities in the portfolio.

51. The method according to claim 30, further comprising the steps of advising the user via the graphical user interface to replace a traded security with another security with sufficiently similar portfolio characteristics, and providing a list of such securities if the user wishes to trade selected securities in the portfolio, and thereby change the mix of securities in the portfolio.

52. The method according to claim 30, further comprising the step of terminating the shield and outputting a required payment to the user via the graphical user interface if the user wishes to sell selected securities in the portfolio, and thereby change the mix of securities in the portfolio.

53. The method according to claim 30, further comprising the step of displaying to the user a plurality of potential shields and a cost associated with each of the plurality of shields, wherein each possible shield is depicted separately on a graph in a three dimension array, in which one axis represents a potential shield, another axis represents the associated cost of the shield, a third axis represents a time horizon over which the shield will be in effect, and each point has an attribute related to both a potential shield and a potential cost and time horizon.

54. The method according to claim 53, further comprising the step of maintaining an association of each asset/liability to each of the points plotted in the graph displayed to the user.

55. The method according to claim 54, further comprising the step of enabling the user to select one of the points in the graph being displayed and then identifying to the user a specific potential shield and a specific cost comprising that point, and which of the assets/liabilities must be maintained in a custodial account to obtain the specific potential shield and the specific cost.

56. The method according to claim 55, further comprising the step of enabling the user to indicate a desired potential shield and a desired cost by selecting one of the points in the graph, and then identifying to the user which of the assets/liabilities must be traded to obtain the desired shield at the desired cost, and the resultant shield and cost from a change in the underlying assets/liabilities.

57. The method according to claim 30, wherein the step of analyzing further comprises analyzing the portfolio using value at risk analysis and sensitivity analysis to determine the price to charge the user based on historical risk and returns for each of the assets/liabilities in the portfolio and expected valuations of the portfolio and predetermined prices associated with such expected valuations and historical risk and returns and the cost of hedging the portfolio using dynamic hedging techniques and publicly-traded or other instruments.

58. The method according to claim 30, further comprising the step of receiving from a plurality of third parties a plurality of competing quotes representing a willingness of each of the third parties to shield specific user portfolios, from which a particular user can select to obtain the best price for a particular user's shielding.

59. An apparatus for enabling an individual investor to manage risk underlying a portfolio of assets/liabilities comprising:
   a) means for prompting a user for information about the portfolio, said information including a list of assets/liabilities in the portfolio to be protected and a corresponding amount of each of the assets/liabilities held in the portfolio;
   b) means for storing the portfolio and the information regarding the portfolio; and
   c) means for analyzing the portfolio to determine a price to charge the user to insure the value of the portfolio at a predetermined level at a predetermined time.

60. The apparatus according to claim 59, further comprising means for receiving the portfolio to be shielded separately from a third party.

61. The apparatus according to claim 59, further comprising means for presenting to the user a plurality of shielding options for insuring the portfolio and a corresponding price for each of the plurality of options.

62. The apparatus according to claim 59, further comprising means for presenting a price to the user for the shield in response to a user specifiable term as a dollar amount payable upon obtaining the shield.

63. The apparatus according to claim 59, further comprising means for presenting a price to the user for the shield as a percentage of any portfolio value increase over a user specified period, wherein if the portfolio does not increase in value, the user owes nothing and if the portfolio decreases in value the user receives whatever amount is necessary to bring the portfolio value back to its current value.

64. The apparatus according to claim 59, further comprising means for presenting to the user the option of reinvesting proceeds received from the securities in the portfolio and from securities that are cashed out in acquisitions in the portfolio pro rata or receiving the proceeds and means for presenting to the user pricing differences for each option.

65. The apparatus according to claim 59, further comprising means for refunding to the user some of the premium paid if the user wishes to sell a part of the portfolio pro rata but otherwise wishes to maintain the balance of the portfolio.

66. The apparatus according to claim 59, further comprising means for advising the user via the graphical user interface to replace a traded security with another security with sufficiently similar portfolio characteristics, and means for providing a list of such securities if the user wishes to trade selected securities in the portfolio, and thereby change the mix of securities in the portfolio.

67. The apparatus according to claim 59, further comprising means for displaying to the user a plurality of potential shields and a cost associated with each of the plurality of shields, wherein each possible shield is depicted separately on a graph in a three dimension array, in which one axis represents a potential shield, another axis represents the associated cost of the shield, a third axis represents a time horizon over which the shield will be in effect, and each point has an attribute related to both a potential shield and a potential cost and time horizon.

68. The apparatus according to claim 67, further comprising means for maintaining an association of each asset/liability to each of the points plotted in the graph displayed to the user.

69. The apparatus according to claim 68, further comprising means for enabling the user to select one of the points in the graph being displayed and then identifying to the user a specific potential shield and a specific cost comprising that point, and which of the assets/liabilities must be maintained in a custodial account to obtain the specific potential shield and the specific cost.

70. The apparatus according to claim 69, further comprising means for enabling the user to indicate a desired potential shield and a desired cost by selecting one of the points in the graph, and then identifying to the user which of the assets/liabilities must be traded to obtain the desired shield at the desired cost, and the resultant shield and cost from a change in the underlying assets/liabilities.

* * * * *